US005102510A

United States Patent [19]

Darian

[11] Patent Number: 5,102,510

[45] Date of Patent: Apr. 7, 1992

[54] PROCESS FOR ELECTROCHEMICAL DEHALOGENATION OF ORGANIC CONTAMINANTS

[75] Inventor: Saeed T. Darian, Sugarland, Tex.

[73] Assignee: ENSR Corporation, Houston, Tex.

[21] Appl. No.: 572,118

[22] Filed: Aug. 23, 1990

[51] Int. Cl.[5] .......... C25B 3/00; C25F 5/00; C02F 1/46

[52] U.S. Cl. .......... 204/59 R; 204/131; 204/149

[58] Field of Search .......... 204/59 R, 72, 130, 131, 204/149

[56] References Cited

U.S. PATENT DOCUMENTS

| | | | |
|---|---|---|---|
| 3,876,514 | 4/1975 | Baizer | 204/59 R |
| 4,098,657 | 7/1978 | Kay et al. | 204/59 R |
| 4,162,948 | 7/1979 | Yagii et al. | 204/80 |
| 4,410,402 | 10/1983 | Sawyer et al. | 204/59 R |
| 4,492,617 | 1/1985 | Davies et al. | 204/73 R |
| 4,585,533 | 4/1986 | Habeeb | 204/149 |
| 4,659,443 | 4/1987 | Byker | 204/131 |
| 4,702,804 | 10/1987 | Mazur et al. | 204/73 R |
| 4,707,230 | 11/1987 | Ajami | 204/72 |
| 4,775,450 | 10/1988 | Ajami | 204/72 |
| 4,853,040 | 8/1989 | Mazur et al. | 204/131 |

FOREIGN PATENT DOCUMENTS

| | | |
|---|---|---|
| 0055476 | 12/1981 | European Pat. Off. . |
| 2089801 | 12/1981 | United Kingdom . |

OTHER PUBLICATIONS

Connors et al., "Determination of Standard Potentials and Electron-Transfer Rates for Halobiphenyls from Electrolytic DATA", Anal. Chem., 57: 170-174 (1985).

Connors et al., "Removal of Chloride from 4--Chlorobiphenyl and 4,4'-Dichlorobiphenyl by Electrocatalytic Reduction", Electrochem. Soc., 130: 1120-1121 (1983).

Andrieux et al., "Heterogeneous and Homogeneous Electron Transfers to Aromatic Halides. An Electrochemical Redox Catalysis Study in the Halobenzene and Halopyridine Series", J. Am. Chem. Soc., 101: 3431-3441 (1979).

Jensen et al, "Reversible Anion Radical-Dianion Redox Equilibria Involving Ions of Simple Aromatic Compounds", J.C.S. Chem. Comm., pp. 367-368 (1974).

"Organic Electrochemistry", Marcel Dekker, Inc., New York (1973).

Kaabak et al., "Mechanism of the Cathodic Process Occurring in the Electrolysis of Solutions of Alkyl Halides in Dimethylformamide", translated from Zhurnal Organicheskoi Khimii, vol. 3, No. 1, pp. 3-6 (1967).

Triebe et al., "Electrochemistry of the Carbon-Halogen Bond. 9-Fluorenyl and Benzhydryl Halides in Dimethylformamide at Platinum and Vitreous Carbon Electrodes", JACS 101:16, pp. 4637-4645 (1979).

*Primary Examiner*—John Niebling
*Assistant Examiner*—Steven Marquis
*Attorney, Agent, or Firm*—Felfe & Lynch

[57] ABSTRACT

A process for the electrochemical dehalogenation of halogenated organic compounds is provided which comprises combining in an electrochemical cell (a) at least one halogenated organic compound or a material comprising one or more halogenated organic compounds;

(b) at least one electrolyte-organic solvent in an amount effective to conduct electric current and which is a solvent for the halogenated organic compound;

(c) at least one sufficiently soluble electroconductive salt in an amount of from about 0.0005 to about 0.02 M; and (d) at least one sufficiently soluble electron transfer compounds wherein the electron transfer compound to salt ratio is from 0.1:1 to 20.1 weight percent; and then applying a voltage to the resulting mixture effective to remove any amount of halogen from said halogenated organic compound.

32 Claims, 2 Drawing Sheets

PROCESS FOR ELECTROCHEMICAL DEHALOGENATION OF ORGANIC CONTAMINANTS

FIELD OF THE INVENTION

The present invention relates to a process for the electrochemical dehalogenation of organic compounds or contaminants. More particularly, this invention relates to the dehalogenation of such organic compounds as polychlorinated biphenyls (PCB's) contained in fluid contaminated therewith.

BACKGROUND OF THE INVENTION

Many halogenated organic compounds and especially polychlorinated biphenyls are known toxins and are widespread environmental pollutants, as such compounds have been used in a variety of industrial and domestic applications. Such applications include electrical insulators, transformers, heat exchange fluids and dry cleaning solvents. PCB's in particular have been found to be a health hazard even at relatively low levels of concentration as such compounds tend to remain in the fatty tissues of a host once entry has been gained, eventually accumulating to toxic levels.

There are many conventional means to dispose of halogenated organic compounds and/or to dehalogenate halogenated organic compounds to less toxic materials. For example, PCBs have been disposed of by high temperature incineration. Such methods have proved unsatisfactory due, for example, to the extremely high temperatures involved to completely combust the higher chlorinated polychlorinated biphenyls and possibly resulting in the formation of even more toxic byproducts such as dioxins.

There are a number of chemical processes for destroying PCBs. For example, U.S. Pat. No. 4,477,354 discloses a process which includes reaction of hydroxides of alkali and alkaline earth metals with PCBs and organic solvents with the end solvents being distilled off. Other chemical processes include the reaction of polychlorinated biphenyls with sodium naphthalimide generated in situ in ether-type solvents such as disclosed in U.S. Pat. No. 4,326,090; the reaction of polychlorinated biphenyls with alkali metal hydroxides in polyglycol or polyglycolmonoalkyl ethers such as disclosed in U.S. Pat. No. 4,400,522; the reaction of PCBs with nickel arylphosphine halide as disclosed in U.S. Pat. No. 4,400,566; the reaction of PCBs with alkalimercaptides as disclosed in U.S. Pat. No. 4,410,422; the reaction of PCBs with molten aluminum which is disclosed in U.S. Pat. No. 4,469,661; and, the reaction of PCBs with liquid sodium such as disclosed in U.S. Pat. No. 4,465,590. Despite the usefulness of such chemical processes in dehalogenating halogenated organic compounds, such processes require the use of hazardous materials and/or complicated reaction schemes also requiring separate isolation and separation steps prior to chemical reaction of PCBs.

An alternative approach to dehalogenation of polyhalogenated organic compounds by chemical methods is dehalogenation by electrochemical techniques. An electrochemical process for dehalogenation of alkyl halides in DMF is disclosed in Kaabak, et al. Org. Chem. U.S.S.R. 3:1 (1967). Other electrochemical processes include halogen removal by direct electron transfer from a cathode in a halogenated organic compound described in Feoktistov Chap. VII, Organic Electrochemistry, Balzen, et al. Eds. New York (1983); radical anion catalyst based dehalogenation described as a method for removing a halogen from an organic halogenated compound in Connors, et al, J. Electrochem Soc., 130:1120 (1983); and Fenn, et al. J. Electrochem. Soc., 123:1643 (1976) disclosing a process for oxidizing commercial mixtures of PCBs at high anodic potentials at a platinum electrode in a medium of aqueous acetonitrile and tetraethylammonium fluoroborate.

Such electrochemical dehalogenation methods described above have generally been regarded as hazardous, complex and expensive and thus commercially unattractive.

Other electrochemical processes include those described in U.S. Pat. Nos. 4,707,230 and 4,775,450 which involve the electrochemical based reaction of a compound capable of forming an iminium ion, e.g., N,N-dimethyl formamide, with a halogenated organic compound. The iminium ion forming compound and a source of halogenated organic compound are combined in a cell. The process also requires that an electroconductivity increasing solute soluble in the iminium ion forming compound be employed in the cell mixture which provides charged species upon dissolution as a means of establishing the desired electrical conductivity in the system, as the iminium ion forming compound does not by itself provide adequate electrical conductivity. Such solutes include tetra alkyl ammonium $BF_4$, chlorides etc. A current at some predetermined peak voltage is then caused to pass through the cell to effect dehalogenation. The iminium ion forming compound is primarily employed as an electrolyte-solvent which dissolves charge-carrying species thereby providing a sufficiently electrically conductive medium to support the electrochemical dehalogenation reaction.

Such processes are based on controlled potential electrolysis and determinations of peak potential for the cathodic reduction of various halogenated organic compounds. These methods suffer from the requirement of relatively high concentrations of expensive electroconductive salts which are consumed in large quantities and are nonrecoverable, and which correspondingly produce reaction byproducts in large quantities which rapidly foul electrodes thereby inhibiting the reaction. These processes also consume large amounts of power due to the large amounts of salts employed. Such processes additionally require the electrochemical reaction to be closely controlled within a narrow potential voltage range by means of fragile and expensive reference electrodes to maintain a predetermined peak potential. Such processes also suffer from low electrochemical reaction rates and high equipment costs associated with their commercialization thereby leaving a continuing need for an efficient and economical process for dehalogenation of halogenated organic contaminants.

It is therefore an object of the present invention to provide a process for the dehalogenation of halogenated organic compounds which is devoid of hazards and uneconomical complexities associated with conventional prior art processes discussed above.

It is a further object of this invention to provide a process for the dehalogenation of halogenated organic contaminants in industrial and domestic applications.

Another object of the present invention is to provide an electrochemical process for the selective dehalogenation of organic contaminants.

An additional object of this invention is to provide such processes which selectively dehalogenate halogenated organic contaminants without affecting the physical and chemical characteristics of materials contaminated by halogenated organic compounds.

Additional objects and advantages of this invention will become readily apparent to those persons skilled in the art from the following discussion.

SUMMARY OF THE INVENTION

Figure 1:
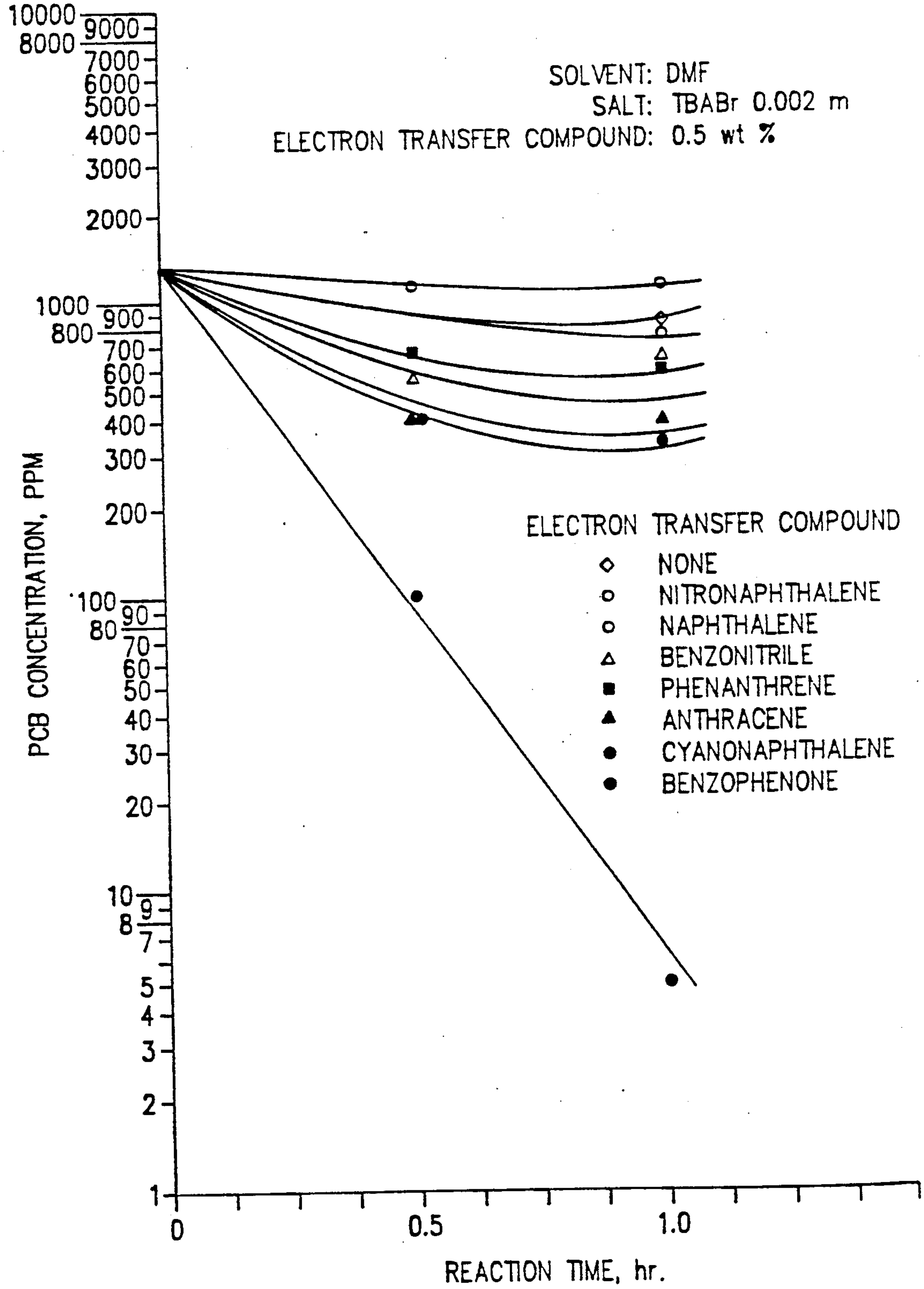
FIG. 1 illustrates a preferred embodiment of the present invention.

In accordance with the present invention a process for the electrochemical dehalogenation of halogenated organic compounds is provided which comprises combining in an electrochemical cell (1) at least one halogenated organic compound or a material comprising one or more halogenated organic compounds; (2) at least one electrolyte-organic solvent in an amount effective to conduct electric current and which is a solvent for the halogenated organic compound; (3) at least one sufficiently soluble electroconductive salt in an amount of from about 0.0005 M to about 0.02 M; and (4) at least one sufficiently soluble electron transfer compound, wherein the ratio of said electron transfer compound to electroconductive salt is from 0.1:1 to 20:1 weight percent; and applying a voltage to the resulting mixture effective to remove any amount of halogen from said halogenated organic compound.

The electrochemical dehalogenation process of the present invention, for example as embodied in the dehalogenation of organic contaminants such as polychlorinated biphenyls, is carried out in an electrochemical cell in an electrolyte-solvent carrying one or more halogenated organic compounds to be dehalogenated in solution in addition to a soluble electroconductive salt and a soluble electron transfer compound, and in which a voltage is applied to oppositely charged cathodes and anodes placed alternately in the electrochemical cell containing the electrolyte solution. The halogenated organic compound can be in substantially pure form and readily solubilized in the electrolyte solvent, or the electrolytesolvent extracts the halogenated organic compounds, for example, from an insoluble material contaminated with these compounds, into solution therewith where the electrochemical dehalogenation reaction occurs. Thus, as shown, the electrolyte solvent must not only be able to carry a current to support the electrochemical reaction, but must also be able to sufficiently solubilize the halogenated organic compound to be dehalogenated as well as to dissolve sufficient charge carrying salts and electron transfer compounds to ensure the desired conductivity and electrochemical reaction rate during the process.

Among several other important aspects, the process of the present invention differs from conventional processes in that it advantageously employs concentrations of charge carrying salts (electroconductive salts) at significantly lower orders of magnitude compared to conventional process. For example, the concentration of electroconductive salt used in conventional electrochemical dehalogenation processes discussed above are typically in the range of from 0.01 to 0.5 M. In contrast, the process of the present invention employs electroconductive salts at concentrations as low as 0.0005 M.

Prior conventional processes have heretofore not recognized that electroconductive salts, for example, tetra alkyl ammonium $BF_4$ which is used as an electroconductivity increasing compound in U.S. Pat. Nos. 4,707,230 and 4,775,450, employed in electrochemical dehalogenation reactions are consumed in large quantities and are unrecoverable and non-recyclable due to formation of inhibitory compounds in the reaction mixture, and thus such processes typically employ large concentrations of expensive salts to force acceptable reaction rates. The high concentration of electroconductive salts present in the reaction mixture in such processes are not only highly uneconomical but lead to further disadvantages such as the production of insoluble polymeric materials in the electrolyte solution which coat and foul the surface of cathodes and the production of other rate inhibiting compounds which further contribute to reaction rate inhibition which is already declining due to rapid depletion of electroconductive salt. Conventional processes have also not recognized that in addition to the formation of insoluble polymeric materials other dehalogenation reaction byproducts are formed which if not removed inhibit the reaction rate significantly.

In accordance with the present invention it has now been surprisingly and unexpectedly found that a significant reduction in electroconductive salt concentration and the rate loss conventional processes would associate therewith can be compensated for by introducing into the system a relatively small quantity of one or more organic compounds which are effective to increase the efficiency of electron transfer and thus significantly increase the rate of dehalogenation, and which are referred to herein as electron transfer compounds. The electron transfer compounds employed in the present invention therefore significantly enhance the rate of electrochemical dehalogenation at sharply reduced concentrations of electroconductive salt thereby providing an efficient and economical process while substantially eliminating problems associated with electrode fouling and low reaction rates in addition to high power costs and other undesirable economic factors associated with the use of relatively large amounts of electroconductive salts, including increased material costs In a further aspect of the process of the present invention, electrochemical dehalogenation can be carried out at applied voltages which are significantly higher than conventional processes. This is due in part to the relatively small amounts of consumable electroconductive salts employed and the resulting high efficiency and specificity of the ensuing electrochemical dehalogenation reaction made possible by use of the electron transfer compounds. In accordance with this invention it has been found that voltage applied during electrochemical dehalogenation which is above the breakdown voltage of a particular halogenated organic contaminant, for example PCBs, significantly increases the dehalogenation rate by increasing current flow in the system. At such overvoltages, the dehalogenation rate is proportional to applied cathodic potential and increases therewith. Below the breakdown voltage of particular contaminants, the rate of dehalogenation is significantly lower. In contrast to the present invention, conventional electrochemical dehalogenation processes such as described above do not employ overvoltages and instead maintain within a narrow range a maximum flow of "reaction-useful" electrical current. The present inventive process which is much more efficient than such conventional processes has much more "reaction-useful" electrical current at its disposal by way of the employ of electron transfer compounds which allow for the selective degradation of target halogenated organic compounds with a concomitant significantly reduced degradation of key species in the electrolyte solution such as the electroconductive salt and electrolyte-solvent. As a result, the electrochemical dehalogenation process of the present invention can employ significantly higher voltage potentials than conventional processes which allows for much faster reaction rates with a corresponding reduction in the scale of equipment needed to process large amounts of halogenated organic compound contaminated materials.

The present invention is further illustrated by the following detailed discussion and illustrative examples of preferred embodiments.

DETAILED DESCRIPTION OF THE INVENTION

As discussed above, the present invention provides a process for the electrochemical dehalogenation of halogenated organic compounds which comprises combining in an electrochemical cell (1) at least one halogenated organic compound or a material comprising one or more halogenated organic compounds, for example PCBs or material contaminated with PCBs; (2) at least one electrolyte-organic solvent in an amount effective to conduct electric current and which is a solvent for the halogenated organic compound; (3) at least one sufficiently soluble electroconductive salt in an amount of from about 0.0005 M to about 0.02 M and (4) at least one sufficiently soluble electron transfer compound wherein the ratio of said electron transfer compound to electroconductive salt is from 0.1:1 to 20:1 weight percent. A voltage is then applied to the resulting mixture which is effective to remove the desired amount of halogen from halogenated species.

The electrochemical dehalogenation process in accordance with the present invention can be conducted in a conventional electrochemical cell equipped with a pair or a number of oppositely charged electrodes including cathodes (working electrodes) and anodes (counter electrodes) placed alternately with electrolyte in the system to complete the cell circuitry for operation of the cell. For example, a plurality of working electrodes and counterelectrodes alternately placed in a pack may be employed. Electrodes can be separated by Daramic spacers, for example, to reduce the quantity of byproducts formed. The electrochemical cell can optionally include a reference electrode placed between the working and counter electrodes to monitor desired working electrode voltages during the electrochemical dehalogenation reaction.

Electrode materials useful in accordance with the present inventive process should be resistant to degradation by and dissolution in the materials and electrolytes employed during the electrochemical process including halogenated organic compounds and materials contaminated therewith. Such materials should also be stable under the electrical field imposed thereon. Suitable materials which can be used as working electrodes are those which will support the electrochemical dehalogenation of halogenated organic compounds, and which are preferably stable and inexpensive. Examples of such suitable working electrode materials include titanium metal electrodes or titanium coated with other materials such as spinels, for example, ruthenium oxide-coated titanium electrodes. Suitable materials which can be used as counter electrodes should be resistant to degradation and corrosion in the presence of the products produced in the electrochemical process. Examples of suitable counter electrode materials include carbon, metal or spinal coated metals. Examples of suitable reference electrodes which can be used include a standard Ag/AgCl electrode, a Pt electrode, and other conventional electrodes known to those skilled in the art which are stable in organic solutions containing an electrolyte. As will be appreciated by persons skilled in the art, the process of the present invention advantageously differs from some conventional electrochemical methods for dehalogenation of halogenated organic compounds in that platinum or mercury electrodes which are expensive and hazardous electrode materials normally used in electrochemical dehalogenation of halogenated organic compounds are not essential and need not be employed herein.

Examples of halogenated organic compounds which can be dehalogenated in accordance with the process of the present invention include polychlorinated biphenyls, polybrominated biphenyls, hexachlorobenzene, tetra- tri-, di- and monoclorinated benzyene, iodobenzene, 1,4-diiodobenzene, 1,5-diiodopentane, 1-iodopentane, bromobenzene, 1-bromopentane, 1,4-dibromobenzene, 2-bromobiphenyl, fluorobenzene, 2-fluorobiphenyl, 1-4-difluorobenzene, pentachlorophenyl, tetrachloroethane, trichloroethylene, perchloroethylene, carbontetrachloride, chloroform, methyene chloride and the like, and mixtures thereof, for example, Aroclors which are mixtures of different isomers of polychlorinated biphenyls and Askarals which are mixtures of Aroclors and chlorinated benzenes. Further examples include commercially used halogenated compounds such as fluorochlorohydrocarbons, freons, and pesticides and insecticides comprising halogenated organic compounds. The process of the present invention is particularly useful with respect to dehalogenation of halogenated organic compounds such as PCBs and chlorinated solvent mixtures used in electrical equipment such as for example, transformers, heat exchange equipment and the like.

The process of the present invention can be employed to dehalogenate substantially pure halogenated organic compounds or mixtures of one or more thereof or halogenated organic compounds dissolved in a fluid or mixed with a solid, for example, by conducting the process of the present invention directly on a fluid or solid comprising (contaminated with) the halogenated compound, or by first pretreating the fluid or solid with an extracting solvent capable of selectively extracting out the halogenated organic compound and then conducting the dehalogenation process of the present invention on the extraction solvent containing the halogenated organic compound. The halogenated organic compounds will then be extracted into the electrolyte which is also a solvent therefor in accordance with this invention, wherein the electrochemical dehalogenation reaction occurs.

Suitable selective extracting solvents which can be used include those selective for the halogenated organic compound of interest and can be easily selected using ordinary skill in the art. Suitable examples of extracting solvents which can be used in this embodiment of the process of the present invention include N,N-dimethyl formamide, 1-methyl-2-pyrrolidone, N,N-diethyl formamide, N,N-dimethyl acetamide acetone, acetonitrile, 1,1,3,3-tetraethylurea, tetramethylurea, N-methyl formamide, dimethyl sulfoxide, butyrolactone, propylene carbonate and the like. These extracting solvents, such as dimethyl formamide, can also be electrolyte-solvents used in the electrochemical process of this invention (discussed in more detail below) and use of these types of solvents is preferred. Thus, the process of the present invention can be conducted on transformer fluids such as mineral oils, silicone oils, perchloroethylene, etc., contaminated with halogenated organic compounds such as polychlorinated biphenyls, and tri- and tetrachlorobenzenes and on the full range of solvents which might be used for cleaning equipment contaminated with halogenated organic compounds.

The contaminated material used in the process of the present invention can be any fluid which desirably does not substantially interfere with the electrochemical process for the dehalogenation of halogenated organic compounds.

As set forth above, the present inventive process is carried out in an electrochemical cell containing an electrolyte-solvent that is capable of conducting electric current and supporting the electrochemical dehalogenation reaction in the presence of an electroconductive salt and an electron transfer compound. The electrolyte-solvent is also a solvent for the halogenated organic compounds which are to undergo dehalogenation. The electrolytesolvent is the continuous phase in the present electrochemical process and is mixed with the halogenated organic compound or contaminated material comprising the halogenated organic compound to form a solution with the halogenated organic compounds solubilized in the electrolyte-solvent where the dehalogenation reaction takes place. When material comprising halogenated organic compounds, for example a contaminated fluid, is employed and such material is not soluble in the electrolyte-solvent, it is preferable that after partitioning the concentration of halogenated organic compound dissolved in the electrolyte solvent is at least as great as the concentration thereof in the contaminated fluid. As the electrochemical reaction occurs in the solvent - continuous phase (in which the other reactants and adjuvants are located) the rate of electrochemical dehalogenation will increase with increasing concentration of the halogenated organic compound in the electrolyte-solvent. Thus, the electrolyte-solvent most preferably has a large partition coefficient for target halogenated compounds which favors an increased concentration of said halogenated organic compound relative to the contaminated material. For purposes of the present invention partition coefficient can be defined as the ratio of the concentration of halogenate compound dissolved in electrolyte-solvent to the concentration of the halogenated compound in a contaminated fluid. It is also desirable that the boiling point of the electrolyte-solvent be below that of the organic contaminant and most preferably below that of any unwanted byproducts for ease of separation of the solvent for recycle. While selection of the electrolyte-solvent is not critical to the invention, such electrolyte-solvents should be selected which are also capable of dissolving sufficient quantities of charge-carrying salts, i.e. electroconductive salts, and electron transfer compounds, (discussed more fully hereinbelow) to ensure high conductivity and desirable electrochemical reaction rates. The electolyte-solvents are also preferably of general availability, low cost and are stable under electrochemical potentials necessary or desirable to carry out the present electrochemical process including the high overvoltage employed. Some examples of suitable solvents which meet the above criteria include N,N-dimethyl formamide, 1-methyl-2-pyrrolidone, N,N-diethyl formamide, N,N-dimethyl acetamide acetone, acetonitrile, 1,1,3,3-tetraethylurea, tetramethylurea, N-methyl formamide, dimethyl sulfoxide, butyrolactone, propylene carbonate or mixtures of two or more of any of the foregoing.

The ratio of electrolyte-solvent to halogenated organic compound or materials contaminated therewith must be at least large enough to provide sufficient conductivity to support the electrochemical dehalogenation reaction in the mixture.

One or more charge-carrying compounds, i.e., electroconductive salts, are also employed in the present inventive process in solution with the solvent-electrolyte to improve the electrical conductivity of the electrolyte solution. Organic and inorganic salts which have sufficient solubility in the electrolyte-solvent to provide the desired electrochemical dehalogenated reaction rate, and which are preferably insoluble in a contaminated fluid comprising the halogenated organic compounds are suitable for use as electroconductive salts in this invention. As such compounds are constantly consumed as reagents in the electrochemical dehalogenation reaction it is also preferable that these compounds are readily available at low cost, provide for relatively high reaction rates at low concentrations and that such compounds do not tend to react, degrade or plate out on the electrodes at voltage potentials necessary for the desired electrochemical dehalogenation reactions to take place, and are also compatible with other components in the cell. Examples of some compounds useful as electroconductive salts herein include tetraalkylammonium, chlorides, borides, iodides and perchlorates such as tetraethylammonium$BF_4$, tetraethylammoniumperchlorate, tetraethylammonium chloride, tetrabutylammonium$BF_4$, tetrabutylammoniumperchlorate, tetraburylammoniumiodide, tetramethylammonium bromide, and tetrabutylammonium bromide, tetramethylammonium bromide, tetraethylammonium bromide and tetrabutylammonium bromide. Examples of inorganic salts include lithium chloride, ammonium chloride, sodium and potassium chloride. Quaternary ammonium salts described in conventional electrochemical dehalogenation processes are preferred, and tetrabutylammonium bromide salt which is inexpensive and greatly facilitates the electrochemical dehalogenation reaction in the present inventive process is most preferred.

As discussed hereinabove, the present inventive electrochemical dehalogenation process employs electroconductive salts in amounts significantly lower than conventional dehalogenation process, and in the range of from about 0.0005 to about 0.02 M, and preferably from about 0.002 to about 0.007 M. The desired concentration of electrochemical salt in the reaction process will depend on the amount of halogenated organic compound present, and the reaction rate desired. As also discussed above, by significantly reducing the concentration of electroconductive salt, the formation of insoluble polymeric byproducts potentially fouling electrodes and inhibiting reaction rates and the formation of other inhibitory byproducts is reduced significantly thereby providing advantages in addition to reduced material costs.

To compensate for the rate loss of electrochemical dehalogenation due to the significantly smaller than conventional amounts of eletroconductive salts employed herein, the electrolyte solution also comprises one or more electron transfer-compounds. Such compounds are typically not electroconductive and do not increase the current density in the cell. The electron transfer compounds are also not presumed to participate as reactants in the present electrochemical dehalogenation process as such compounds are not consumed in any appreciable amount in the reaction processes. In accordance with the present invention, such electron transfer compounds have surprisingly and unexpectedly been found to greatly facilitate the electrochemical dehalogenation reaction at the aforesaid low concentrations of electroconductive salts. For example, it has been found that the employ of about 0.5 wt. % of an electron transfer compound in the reaction mixture containing about 1000 ppm PCBs with an average electroconductive salt concentration of about 0.1 wt. % can increase the dehalogenation rate of polychlorinated biphenyls by a factor of 1O. Without intending to limit this invention to theory it is believed that the electron transfer compounds facilitate the flow of electrons from electrode surfaces to the target halogenated organic compounds thereby greatly improving electron efficiency and thus the efficiency of the present inventive electrochemical dehalogenation process. Such increase in dehalogenation rates of reaction without corresponding increase in current density clearly indicates the vastly improved efficiency of the present inventive process with corresponding significant reduction in power requirements. For example, in conventional processes which do not employ electron transfer compounds, the electron efficiency is typically between 100 and 500. In the present inventive process, electron efficiency is usually less than 10. Electron efficiency for purposes of this invention can be defined as the number of electrons consumed per one atom of halogen eliminated from a polyhalogenated organic compound.

Materials useful as electron transfer compounds in this invention are capable of forming anion radicals during the electrochemical reduction of halogenated organic compounds, and are sufficiently soluble in the electrolyte-solvent to provide the desired electrochemical dehalogenation reaction rate. Some representative examples of compounds useful herein as electron transfer compounds include polynuclear aromatic organic compounds, such as, for example, benzophenone, anthracene, and cyanonaphthalene, with benzophenone being preferred.

In a further aspect of the present invention, it has been found that proper control of the electron transfer-/electro-conductive salt ratio can influence both the electrochemical dehalogenation rate and selectivity in the extent of dehalogenation of halogenated compounds, depending upon the particular reactants and adjuvants employed, their concentrations and processing conditions. More particularly, one or more halogen atoms up to all the halogen atoms bonded to the organic compound can be selectively removed in the process of the invention to permit partial dehalogenation to a degree desired which is less than complete dehalogenation of the compound. For example in the dehalogenation of trichlorobenzene, the amount of mono- and dichlorobenzenes as products can be controlled by varying the ratio of electron transfer compound to electroconductive salt.

To achieve high electrochemical dehalogenation reaction rates and/or to control the degree of selectivity in the extent of dehalogenation an electron transfer compound to electroconductive salt ratio of about 0.1:1 to about 20:1 by weight is employed in the present process with a ratio of about 1:1 to about 10:1 preferred. Depending upon the particular electrochemical system employed, for example, the type and amount of halogenated organic compound present, the desired ratio to obtain the desired reaction rate and/or desired selectivity can easily be determined by routine experimentation.

Further, as the electroconductive salt is a reagent in the present process and byproducts thereof, especially polymeric byproducts, will form undesirable coatings on electrodes corresponding to the salt concentration, a properly selected electron transfer compound to electoconductive salt ratio will greatly minimize the formation of such reaction rate inhibiting coatings.

In the present inventive process, after the halogenated organic compound or compounds or materials contaminated therewith are combined in an electrochemical cell with electrolyte-solvent and the desired amounts of electroconductive salt and electron transfer compound, a potential is applied between the working and counter electrodes, or between the working electrode and reference electrode if employed, effective to produce the desired degree and rate of dehalogenation. Thus, the desired potential applied will vary depending upon the specific electrochemical processing involved. This potential can easily be determined by routine experimentation, and can vary widely depending upon such factors as the compounds to be dehalogenated, the particular electrolyte compounds, electroconductive salts and electron transfer compounds employed and their respective concentrations and the rate and extent of dehalogenation desired.

As discussed above, it has been found in the present invention that it is not necessary to control the electrochemical cell voltage within a narrow range at or below a cathode potential which is equivalent to the breakdown voltage of a particular halogenated compound such as practiced in conventional processes, as the overall voltage increases the current density in the cell thereby increasing the overall rate of the dehalogenation reaction. For example, depending upon reaction conditions, an increase in overall cell voltage from 8 volts to 12 volts can increase the rate of the electrochemical dehalogenation reaction by a factor of 2 in the present inventive process.

As also discussed above, due in part to the greatly increased electron efficiency of the present electrochemical dehalogenation process, much higher voltage potentials are applied compared to conventional processes to greatly increase reaction rates with increased specificity in dehalogenation of target halogenated organic compounds. Further, due to the increased electron efficiency, such high reaction rates are accompanied by a significant reduction in degradation per unit time of components of the electrolyte solution.

Generally, the potential employed can range from less than 1 to in excess of 20 volts. The dehalogenation rate will increase significantly with an increase in cathodic potential as the electron flow in the electrochemical reaction mixture is increased thereby improving the frequency of collision between electrons and the target halogenated compounds. As mentioned above, for example, the actual voltage will of course depend upon the type of halogenated compound present. In dehalogenation of PCBs, for example, the preferred range of overall cell voltage is from about 6 to about 16 volts, and most preferably from about 7 to about 12 volts.

The magnitude of such high overvoltage useful in the practice of this invention will be limited by practical effects such as anode corrosion and excessive degradation of electroconductive salt, electron transfer compounds and electrolyte solvent.

The present inventive process can also be carried out over a wide range of temperatures and pressures depending upon the particular reactants and electrolyte components employed, applied cell voltages, and other processing conditions. While the temperature is not critical, certain temperature ranges are preferred depending upon such reaction parameters described above, and can easily be optimized on a case-by-case basis without undue experimentation.

For example, electrochemical dehalogenation of PCBs in accordance with this invention is preferably carried out at a temperature of 0° C. to about 100° C., more preferably at 25° C. to 80° C., and most preferably to 35° C. to 50° C. In particular, the rate of dechlorination of PCBs has been found to be low at temperatures from 0° C. to 20° C. with the optimum rate in the range from 20° C. to 50° C. At temperatures much above 50° C., an adverse effect on PCB dechlorination may begin to be observed.

After the electrochemical dehalogenation of the halogenated organic compounds is complete to the desired degree, the reaction is stopped. If two fluids in the electrochemical cell are immiscible, time is allowed for phase separation to occur. The electrolyte solvent will contain any unreacted halogenated organic compounds, the electroconductive salt, electron transfer compound and products and byproducts which are formed during electrochemical reactions. The electrolyte solvent which is typically lower boiling than other species present in the cell can then be recovered, for example, by distillation and sent back to the electrochemical cell for further use. The bottoms of the distillation column will also include any portion of the material comprising the halogenated organic compound or compounds (contaminated material) which is soluble in the electrolyte solvent, and can be further processed or disposed of as hazardous waste.

The material now comprising acceptable levels of halogenated organic compounds will contain residual amounts of electrolyte solvent which can be further recovered by, for example, distillation.

In a further preferred embodiment of the invention, reaction byproducts are continuously or at least periodically removed from the reaction cell to further maintain high reaction rates. For example, it has been found that HCl formed as a reaction byproduct from dehalogenation of a chlorinated organic contaminant may form a complex with DMF. The DMF:HCl complex if allowed to accumulate to appreciable levels in the reaction mixture can inhibit the reaction to undesirably low rates. The byproduct HCl may also in and of itself display inhibitory effects. Such undesirable byproducts or complexes can be removed by distillation or absorbed, for example, by a common caustic compound such as lithium hydroxide, sodium hydroxide, potassium hydroxide, calcium carbonate, sodium carbonate, and the like. An absorbent or adsorbent such as clay may also be employed to remove undesirable reaction byproducts. Such byproducts which foul electrode surfaces can also be dislodged by ultrasonic processing methods and then removed from the system, for example, by filtration. Other methods to remove byproducts which foul electrode surfaces include mechanical scrubbing and chemical treatment with acids or bases, or other suitable conventional methods to clean electrodes. Removal of inhibitory products can be accomplished batchwise or portions of the electrolyte solution can be removed periodically as a slipstream and treated appropriately and the recovered electrolyte-solvent recycled for further use.

In an additional embodiment of the present inventive process, a quantity of water or some other suitable source of protons may also be present in the electrochemical cell reaction mixture. The quantity of water can be easily adjusted to facilitate and optimize the desired reaction rates.

The present inventive process can be conducted as a batch process, a semicontinuous process or a continuous process.

The process of the present invention is further illustrated by reference to the following examples. It is to be understood, however, that these examples are for illustrative purposes only and are not intended to limit the scope of the specification or claims or the spirit thereof in any way.

EXAMPLE 1

Effect of Overall Cell Voltage on Electrochemical Dehalogenation Rate

A series of experiments were carried out in an electrochemical cell equipped with a plurality of cathode and anode plates alternatingly arranged in a pack. The cathode plates totaled in area equal to 325 $cm^2$. The cathode plates were constructed of titanium and the anode plates of ruthenium oxide-coated titanium. A standard Ag/AgCl reference electrode was also employed. To the electrochemical cell was added 325 ml DMF, and to the DMF was then added enough PCB to achieve a concentration of approximately 700 mg/l in Experiments 1 and 2, and 250 mg/l in Experiments 3 and 4 as set forth below in Table 1. Various concentrations of tetrabutylammonium$BF_4$ and tetrabutylammoniumbromide, as also summarized below in Table 1, were employed in Experiments 1-2 and 3-4, respectively. Different voltage potentials were then applied to the cell in each experiment at an initial temperature of about 25° C. for a time sufficient to attain the indicated final amounts of PCBs remaining in the electrolyte solution. The post reaction concentration of PCBs in each experiment was determined by gas chromatography, and the PCB dehalogenation rates in mg/hr $cm^2$ determined. The results are summarized below in Table 1.

TABLE 1

| Exp. # | Salt, conc. (M) | V. | Current Density (mA/$cm^2$) | PCB conc. | PCB (mg/l) | PCB Reaction rate (mg/hr $cm^2$) |
|---|---|---|---|---|---|---|
| 1 | TBABF4, 0.5 | 5.3 | 12 | 700 | 520 | 1.54 |
| 2 | TBABF4, 0.5 | 7 | 50 | 700 | 440 | 4.22 |
| 3 | TBABr, 0.009 | 8 | 3 | 250 | 117 | 0.42 |
| 4 | TBABr, 0.009 | 12 | 5 | 250 | 22 | 0.72 |

As indicated in Table 1, current density is directly proportional to cell voltage as an increase in cell voltage causes an increase in current density at a constant electroconductive salt concentration thereby effecting an increase in reaction rate in the present inventive process. As shown in this experiment, depending upon the concentration and type of halogenated organic compounds present, an approximate voltage necessary to achieve a desirable reaction rate can easily be determined.

EXAMPLE 2

Effect of Electron Transfer Compound on Electrochemical Dehalogenation Rate

A series of experiments were carried out using the electrochemical cell described in Example 1 to illustrate the effect of various electron transfer compounds on the rate of PCB dechlorination in the presence of small quantities of electroconductive salts in accordance with the present invention. Dimethylformamide was employed as an electrolyte-solvent containing 0.002 M tributylammonium bromide. The experiments were carried out at an overall cell voltage of 8 volts and at approximately ambient temperature. A temperature increase of about 10° C. to about 15° C. per hour of reaction time was observed. A series of electron transfer compounds as indicated in FIG. 1 were employed in the electrochemical dechlorination reactions at 0.5 wt. % (based on weight of DMF) each and the PCB dechlorination rates for each plotted in PCB concentration (ppm) per fraction of 1 hr. As illustrated in FIG. 1, benzophenone is shown to be clearly superior to other compounds, at least within the confines and parameters of this example, for the dechlorination of PCBs. From FIG. 1, it can be estimated that at 0.002 M electroconductive salt concentration the addition of 0.5 Wt. % of benzophenone to the electrolyte reaction mixture increases the rate of PCB dechlorination by a factor of 10.

EXAMPLE 3

Effect of Electron Transfer Compounds on Electron Efficiency and Electrode Fouling in Electrochemical Dehalogenation A series of experiments were carried out sequentially in an electrochemical cell equipped with electrodes such as described in Example 1 to illustrate the significantly reduced rate of electrode fouling accomplished by the present invention. The cell has a volume of 325 ml, and an area of 363 $cm^2$. The electrolyte contained a 1:1 ratio of PCB contaminated mineral oil and dimethylformamide having a concentration of 0.0038 M tributylammoniumbromide and 0.4 wt. % benzophenone as the electron transfer compound. Reaction times, cell voltages and other reaction parameters for each experiment are summarized below in Table 2 along with resulting reaction rates and cell efficiencies.

TABLE 2

| Experiment # | Reaction Time (hr) | Cell voltage (V) | Reaction Temp. (°C.) | Current Density ($mA/cm^2$) | PCB Conc. (ppm) Init. | Final | Reaction Rate ($mg/hr. cm^2$) | Cell Effic. ($e/cl^-$) |
|---|---|---|---|---|---|---|---|---|
| 1 | 0.5 | 8 | 27 | 2.12 | 2005 | 127 | 1.68 | 3 |
| 2 | 0.5 | 8 | 28 | 2.30 | 2005 | 74 | 1.72 | 3 |
| 3 | 0.5 | 8 | 29 | 2.30 | 2005 | 102 | 1.70 | 3 |
| 4 | 0.5 | 8 | 28 | 2.66 | 2005 | 117 | 1.69 | 3 |
| 5 | 0.5 | 8 | 29 | 2.47 | 2005 | 154 | 1.66 | 3 |
| 6 | 0.5 | 8 | 28 | 2.20 | 2005 | 153 | 1.66 | 3 |
| 7 | 0.5 | 8 | 28 | 2.47 | 2005 | 95 | 1.71 | 3 |
| 8 | 0.5 | 8 | 29 | 2.43 | 2005 | 165 | 1.65 | 3 |
| 9 | 0.5 | 8 | 30 | 2.67 | 2005 | 154 | 1.66 | 3 |
| 10 | 0.5 | 8 | 30 | 2.76 | 2005 | 140 | 1.67 | 3 |
| 11 | 0.5 | 8 | 30 | 2.66 | 2005 | 110 | 1.70 | 3 |

As shown in Table 2, eleven experiments were carried out in succession in the electrochemical cell for a total operating time of 5.5 hours in the absence of a significant reduction in reaction rate. In the above experiments, the same electrode pack was used in each experiment without physical or chemical cleaning of reaction byproducts from the electrode surfaces. The results indicate that substantial fraction of the cathode surfaces were available for reaction even after 5.5 hours. In conventional processes, rapid fouling of electrode surfaces would be expected.

EXAMPLE 4

Comparative Experiments-Effect of Electron Transfer Compounds on Electron Efficiency in Electrochemical Dehalogenation A series of experiments were carried out using the electrochemical cell described in Example 1 to compare the efficiency of the present inventive process to conventional processes using relatively high concentrations of electroconductive salts. Concentrations of reactants as well as well as other reaction parameters and results of reaction rates and efficiences are summarized below in Table 3.

TABLE 3*

| Exp. # | Cell voltage (v) | Salt emc (m) | Electron Transfer compound (wt. %) | Current Density (mA/cm) | Temp. °C. | Reaction Rate mg/hr cm | Cell effic. $e/cl^-$ |
|---|---|---|---|---|---|---|---|
| 1 | 8 | TBABr, 0.01 | none | 6 | 29 | 0.56 | 24 |
| 2 | 7 | TEACl, 0.1 | none | 17 | 60 | 0.86 | 46 |
| 3 | 8 | TEACl, 0.002 | Anthracene (0.5%) | 1.5 | 31 | 0.75 | 4 |
| 4 | 6 | TBABI, 0.0018 | Anthracene (0.5%) | 2.0 | 29 | 1.2 | 5 |

TABLE 3*-continued

| Exp. # | Cell voltage (v) | Salt emc (m) | Electron Transfer compound (wt. %) | Current Density (mA/cm) | Temp. °C. | Reaction Rate mg/hr cm | Cell effic. e/cl⁻ |
|---|---|---|---|---|---|---|---|
| 5 | 8 | TBABr, 0.002 | Benzophenone (0.5%) | 2.6 | 30 | 2.1 | 3 |

*All experiments had an initial PCB concentration of about 1,000 ppm and a final PCB concentration of about 100 ppm.

The present invention as clearly illustrated in Table 3 shows superior results over conventional processes whereby the use of an electron transfer compound reduces electron consumption by up to a factor of 10 with a concominant reduction in the power requirements of the electrochemical cell, and a corresponding significant reduction in the amount of electroconductive salt required. For example, from a comparison of experiments 2 and 5 the salt concentration was reduced by a factor of 50 in experiment 5 while the rate of reaction in this experiment increased by a factor of 2.44.

EXAMPLE 5

Selective Partial Dehalogenation of Halogenated Organic Compounds

This example illustrates a further aspect of the present invention where trichlorobenzene is selectively electrochemically dehalogenated to di- and subsequently to monochlorobenzene. An electrochemical cell such as described in Example 1 was employed having an area of 325 $cm^2$ and containing 325 ml DMF with about 0.01 M TBABr (1 g) employed as the solvent-conducting medium. Benzophenone as the electron transfer compound was employed at a concentration of 0.2 M, (10 g) for a benzophenone to TBARr weight ratio of 10:1. 5 g of 1,2,4-trichlorobenzene was added to the DMF containing electolyte solution. A constant voltage of 8 was applied at an initial temperature of 25. The temperature increased to 55° C. after 3 hours of reaction. As the reaction proceeded test portions of electrolyte solution were removed and analyzed by gas chromatography for the presence of halogenated compounds.

Figure 2:
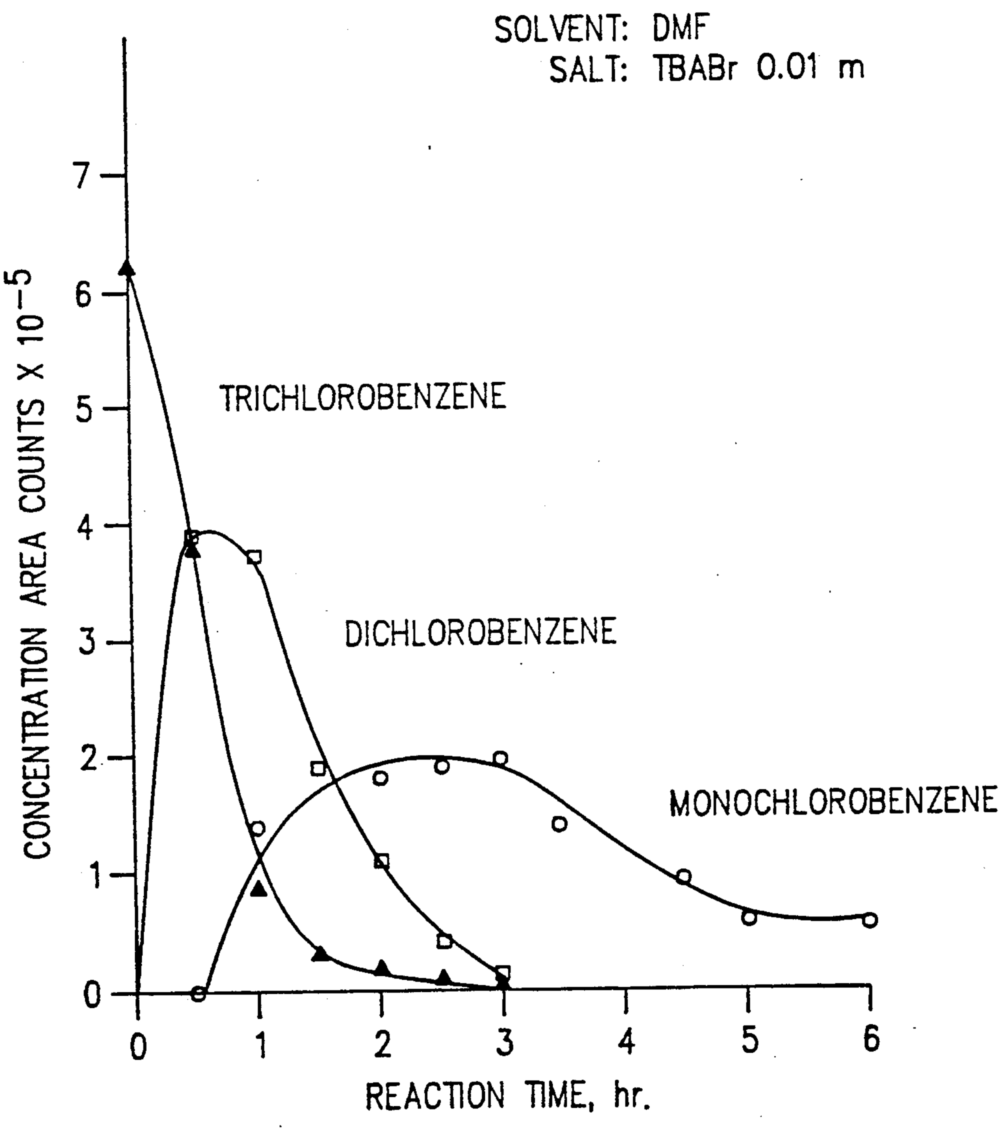
FIG. 2 illustrates an aspect of the invention.

The results of this example are illustrated in FIG. 2 which show the rate of trichlorobenzene dehalogenation, and finally monochlorobenzene formation and destruction per unit time. It will be readily apparent to persons skilled in the art that the electrochemical reaction can be easily terminated at the desired degree of dehalogenation to obtain, for example, a monochlorinated feedstock useful in the petrochemical industry.

What is claimed by letters patent is:

1. A process for the electrochemical dehalogenation of halogenated organic compounds comprising, combining in an electrochemical cell,
   (a) at least one halogenated organic compound or a material comprising one or more halogenated organic compounds;
   (b) at least one electrolyte-organic solvent in an amount effective to conduct electric current and which is a solvent for the halogenated organic compound;
   (c) at least one sufficiently soluble electroconductive salt in an amount of from about 0.0005 M to about 0.02 M; and
   (d) at least one sufficiently soluble electron transfer compound, wherein the ratio of said electron transfer compound to electroconductive salt is from 0.1:1 to 20:1 weight percent; and then applying a voltage to the resulting mixture in said electrochemical cell effective to remove any amount of halogen from said halogenated organic compound.

2. The process of claim 1 wherein said electroconductive salt is present in an amount of about 0.002 to about 0.007 M.

3. The process of claim 1 wherein the ratio of electron transfer compound to electroconductive salt is from 1:1 to 10:1.

4. The process of claim 1 wherein said halogenated organic compound is selected from the group consisting of polychlorinated biphenyls, polybrominated biphenyls, hexachloroenzene, tetra-,tri- di- and monochlorobenzene, iodobenzene, 1,4-iodobenzene, 1,5-diidopentane, 1-iodopentane, bromobenzene, 1-bromopentane, 1,4-dibromobenzene, 2-bromobiphenyl, fluorobenzene, 2,-fluorobiphenyl, 1,4-difluorobenzene, pentachlorophenyl, tetrachloroethane, trichloroethylene, perchloroethylene, carbon-tetrachloride, chloroform, methylene chloride, chlorofluorohydrocarbons and mixtures of two or more of the foregoing.

5. The process of claim 1 wherein the halogenated organic compound comprises a mixture of polychlorinated biphenyls and tetra-, tri-, di- and monochlorobenzene.

6. The process of claim 2 wherein the halogenated compound is hexachlorobenzene, tri-, di- or monochlorobenzene, trichloroethylene, tetrachloroethane or mixtures of any of the foregoing.

7. The process of claim 1 wherein said electrolyte-solvent is selected from the group consisting of N,N-dimethyl formamide, 1-methyl-2-pyrrolidone, N,N-diethyl formamide, N,N-dimethylacetamide, acetone, acetonitrile, 1,1,3,3-tetraethylurea, N-methyl formamide, dimethylsulfoxide, butyrolactone, propylene carbonate or mixtures of two or more of the foregoing.

8. The process of claim 1 wherein said electroconductive salt is selected from the group consisting of tetraethylammonium $BF_4$, tetraethylammoniumperchlorate, tetraethylammoniumchloride, tetrabutylammonium BF4, tetrabutylammoniumperchlorate, tetrabutylammoniumiodide, tetramethylammoniumbromide, tetrabutylammonium bromide, tetraethylammonium bromide, lithium chrloride, ammonium chloride, sodium chloride, potassium chloride or mixtures of any of the foregoing.

9. The process of claim 8 wherein said electroconductive salt is a quaternary ammonium salt.

10. The process of claim 9 wherein said electroconductive salt is tetrabutylammonium bromide.

11. The process of claim 1 wherein said electron transfer compound is a polynuclear aromatic organic compound.

12. The process of claim 11 wherein the electron transfer compound is selected from the group consisting of benzophenone, anthracene, cyanonaphthalene, nitronaphthalene, naphthalene, benzonitrile, phenanthrene or mixtures thereof.

13. The electron transfer compound of claim 11 wherein the electron transfer compound is benzophenone.

14. The process of claim 1 wherein the applied voltage is from 6 to 16 V.

15. The process of claim 14 wherein the applied voltage is from 7 to 12 V.

16. The process of claim 1 wherein the electrochemical cell further comprises water.

17. The process of claim 1 wherein said process is conducted batchwise, semicontinuously or continuously.

18. The process of either claims 1-17 wherein a material comprising one or more halogenated organic compounds is combined in the electrochemical cell, and wherein said material is not soluble in said electrolytesolvent.

19. The process of claim 18 wherein said electrolytesolvent has a high partition coefficient for said halogenated organic compound relative to said insoluble material.

20. A process for the electrochemical dehalogenation of halogenated organic compounds comprising combining in an electrochemical cell having a cathode and anode, (a) at least one halogenated organic compound or a material comprising one or more halogenated organic compounds;

(b) at least one electrolyte-solvent in an amount effective to conduct electric current in said electrochemical cell and which is a solvent for the halogenated organic compound;

(c) at least one sufficiently soluble quaternary ammonium salt compound in an amount from 0.0005 to 0.02 M; and (d) at least one sufficiently soluble polynuclear aromatic electron transfer compound, wherein the ratio of said electron transfer compound to quaternary ammonium salt is from 0.1:1 to 20:1;

applying a voltage to the resulting mixture in said electrochemical cell effective to remove any amount of halogen from said halogenate organic compound without substantial degradation to the other components in said electrochemical cell; and separating dehalogenated products of reaction from the contents of the electrochemical cell.

21. The process of claim 20 wherein the contents of the electrochemical cell are continuously, periodically or intermittently contacted with a material effective to remove substances which inhibit the electrochemical dehalogenation of said halogenated organic compound, or said substances which inhibit the electrochemical dehalogenation are continuously, periodically or intermittently removed from portions of the electrochemical cell surface.

22. The process of claim 20 wherein the electrochemical cell further comprises water.

23. The process of claim 22 wherein said water is present in a concentration from about 0.005 M to about 1 M.

24. The process of claim 20 wherein the halogenated organic compound is selected from the group consisting of N,N-dimethyl formamide, 1-methyl-2-pyrrolidone, N,N-diethyl formamide, N,N-dimethylacetamide, acetone, acetonitrile, 1,1,3,3-tetraethylurea, N-methyl formamide, dimethylsulfoxide, butylrolactone, propylene carbonate or mixtures of two or more of the foregoing.

25. The process of claim 20 wherein the halogenated organic compound comprises a mixture of polychlorinated biphenyls and tetra-, tri-, di- and monochlorobenzene.

26. The process of claim 25 wherein said-electrolytesolvent is N,N-dimethyl formamide.

27. The process of claim 26 wherein said quaternary ammonium salt is tetraburtylammonium bromide.

28. The process of claim 20 wherein said process comprises completely dehalogenating said halogenated organic compound.

29. The process of claim 20 wherein said process comprises less than completely dehalogenating said halogenated organic compound.

30. The process of claim 29 wherein said process comprises selectively dehalogenating said halogenated organic compound.

31. The process of either of claims 20-30 wherein a material comprising one or more halogenated organic compounds is combined in the electrochemical cell, and wherein said material is not soluble in said electrolytesolvent.

32. The process of claim 31 wherein said electrolytesolvent has a high partition coefficient for said halogenated organic compound relative to said insoluble material.

* * * * *